United States Patent
McLinda

(10) Patent No.: US 8,297,565 B2
(45) Date of Patent: Oct. 30, 2012

(54) PORTABLE SUPPORT MOUNT

(76) Inventor: Graeme S. McLinda, Norfolk, VA (US)

(*) Notice: Subject to any disclaimer, the term of this patent is extended or adjusted under 35 U.S.C. 154(b) by 186 days.

(21) Appl. No.: 12/818,212

(22) Filed: Jun. 18, 2010

(65) Prior Publication Data

US 2011/0308131 A1    Dec. 22, 2011

(51) Int. Cl.
*F16M 11/00* (2006.01)

(52) U.S. Cl. .......... 248/161; 248/176.1; 248/176.3; 248/157; 248/158; 248/221.11; 42/94; 89/36.01; 89/37.04

(58) Field of Classification Search .......... 248/158, 248/163.1, 176.1, 176.3, 188.4, 157, 676, 248/230.1, 351, 440.1, 160, 168, 677, 221.11; 42/94; 89/36.01, 37.04

See application file for complete search history.

(56) References Cited

U.S. PATENT DOCUMENTS

| | | | |
|---|---|---|---|
| 879,052 A * | 2/1908 | Jeranek | 89/40.06 |
| 3,225,656 A | 12/1965 | Flaherty et al. | |
| 3,703,046 A * | 11/1972 | Barone et al. | 42/94 |
| 3,947,988 A | 4/1976 | Besaw | |
| 4,676,021 A | 6/1987 | Groba | |
| 4,913,391 A * | 4/1990 | Klipp | 248/214 |
| 5,081,782 A * | 1/1992 | Wright | 42/94 |
| 5,903,995 A | 5/1999 | Brubach | |
| 5,979,099 A * | 11/1999 | Kervin | 42/94 |
| 7,431,252 B2 * | 10/2008 | Birli et al. | 248/221.11 |
| 7,493,719 B2 | 2/2009 | Lackey | |
| 7,500,328 B1 | 3/2009 | Bean | |

* cited by examiner

*Primary Examiner* — Alfred J Wujciak, III
*Assistant Examiner* — Todd M Epps
(74) *Attorney, Agent, or Firm* — Michael L. Greenberg, Esq.; Greenblum & Lieberman, LLC

(57) ABSTRACT

A portable support mount designed for attachment to a shooting rail or other surface in order to support a rifle or other object. The portable support mount attaches to and is held level on a surface by means of a spring clamp and a stabilization bar with bumpers made of rubber attached to the ends of the stabilization bar. The spring clamp is fused to a support tube housing a rod that can vary the height of the mount. On top of the rod is a detachable holding member on which a user places the forend of a rifle while aiming and firing it. In addition, the holding member can be removed from the portable support mount, and the rod can attach to a camera, telescope, small video camera, or other device.

4 Claims, 2 Drawing Sheets

PORTABLE SUPPORT MOUNT

FIELD OF THE PRESENT INVENTION

The present invention relates to portable support mounts designed for attachment to a shooting rail or other surface in order to support and stabilize a rifle or other object. The support mount attaches to and aligns with a surface by means of a spring clamp and a stabilization bar with bumpers made of rubber attached to the ends of the stabilization bar. The spring clamp is fused to a support tube that houses a rod surmounted by a detachable holding member. Although the holding member is designed to support the forend of a rifle when the user is zeroing in on a target and firing the rifle, the holding member can be removed and the rod can be surmounted by a camera, telescope, small video camera or other device. The present invention is light and compact, yet has a tensile power and durability most often associated with products of much greater size and weight.

BACKGROUND OF THE PRESENT INVENTION

Support mounts have been utilized as rifle rests since the invention of firearms, enabling users to aim and fire with better control and substantially improved accuracy. From sand bags used when firing from the prone position, to tree stands placed above animal pathways, mounts have come in a wide variety of designs. Tripods, bipods and monopods are some of the styles commonly known as support mounts used as rifle rests.

The chief concern with any support mount used as a rifle rest is the ease with which it can be quickly repositioned to adapt to a changed shooting situation. A user should be able to quickly and easily move the mount to provide stable sight alignment for aiming and firing in any direction where a target is located. Previous inventions, described below, partially fulfill those requirements, but their deficiencies show the need for the features offered by the present invention.

U.S. Pat. No. 4,913,391 issued to Klipp on Apr. 3, 1990 is a for sportsman's gun rest and object holder. Unlike the present invention, Klipp uses a portable bracket with an attaching clamp, whereas the present invention uses a spring clamp without need of a bracket. Because a bracket is not used, the present invention can be repositioned quicker and with less effort.

U.S. Pat. No. 3,225,656 issued to Flaherty et al. on Dec. 28, 1965 is for a mount for use as a rifle rest, employing a base secured to an object by bolts or pegs to keep the mount in place. The present invention has no need of bolt or pegs, as it employs an easily mountable and removable spring clamp to secure the portable support mount to a shooting rail or other surface.

U.S. Pat. No. 3,947,988 issued to Besaw on Apr. 6, 1976 is for a portable mount. Unlike the present invention, Besaw employs support blocks for placement onto a surface to provide a shooting base, with a V-shaped notch on the topmost block to hold a rifle in place. The present invention, however, employs an extendable holding member on top of a compact support tube with an easily mountable and removable spring clamp and stabilization bar at its base, allowing the present invention to be quickly established in a new and stable position.

U.S. Pat. No. 7,493,719 issued to Lackey on Feb. 24, 2009 is for an apparatus and method of supporting a firearm. Unlike the present invention, Lackey uses a device that can be mounted onto an upright pole or stick, then adjusted for height and tightened in place so that the stock of a firearm can be rested upon it. The present invention, however, employs an extendable holding member on top of a compact support tube with an easily mountable and removable spring clamp and stabilization bar at its base, allowing the present invention to be quickly established in a new and stable position.

U.S. Pat. No. 5,903,995 issued to Brubach on May 18, 1999 is for a monopod mount for use as a rifle rest. Unlike the present invention, Brubach uses a flat or pointed base unit, along with attachment straps to fasten the rifle to the mount. The present invention, however, employs an extendable holding member on top of a compact support tube with an easily mountable and removable spring clamp and stabilization bar at its base, allowing the present invention to be quickly established in a new and stable position.

U.S. Pat. No. 7,500,328 issued to Bean on Mar. 10, 2009 is for a method and apparatus for supporting a shotgun. Unlike the present invention, Bean's invention is a bipod device and also lacks the holding member employed by the present invention.

U.S. Pat. No. 4,676,021 issued to Groba on Jun. 30, 1987 is for a portable firearm support. Like the present invention, Groba uses a holding member at one end, but Groba lacks the spring clamp and stabilization bar at the base of the device that are distinctive features of the present invention.

SUMMARY OF THE PRESENT INVENTION

The present invention relates to a portable support mount designed primarily as a rifle rest for use in aiming and firing a rifle, but also useful as a portable and stable mount for a camera, telescope, small video camera, or other device. In its capacity as a rifle rest, the present invention was created with the tree stand hunter in mind, and is ideally suited for use with ladder stands, lock-on stands, and climbing stands. It also can be clamped to any firm surface (to a partially opened car window, for example) with a camera, telescope, small video camera, or other visual device attached, making it ideal for bird watching, whale watching, and other pursuits.

When used as a rifle rest in a tree stand, the present invention overcomes the problem of a tree stand's low shooting rail, which can force a hunter to assume an uncomfortable shooting position in order to make an accurately placed shot. Another problem commonly encountered with a shooting rail is the flat, horizontal rail that allows a rifle to slide out of position, thus hindering accuracy. A stable mount at a height comfortable for the hunter is critical to accurate shot placement, and the present invention brings this about. The stability provided by the present invention also makes it invaluable as a support mount for a camera, telescope, small video camera, or other device.

Of currently available mounts, some are required to be fastened to a shooting rail. One problem with such products is that a rifle can't be moved in an instant to shoot in a different direction. The present invention, however, can be quickly and quietly repositioned in a different direction. Again, this aspect of the present invention makes it ideal as a mount for a camera, telescope, or small video camera employed by a user observing quick-moving wildlife.

Another problem with currently available mounts is that they require the user to carry tools into the field. Tools add weight and noise to a pack and are undesirable. Other products employ the use of thumb nuts or wing nuts to attach a mount to a surface, but the downside to these is the possibility of dropping a piece with gloved or cold hands, then trying to find the dropped piece in the dark. Again, these kinds of mounts can't be repositioned easily or quickly to adjust to an animal's quick movement to another position. Other products are bulky and take up a lot of space and add weight to outdoor gear. Up to now, there has not been a product that remedies all these issues as does the present invention.

At its lowest setting, the present invention puts the rifle or other device approximately six inches above the surface to which it is attached, and at its highest setting approximately eight inches. The user can adjust the mount to custom fit his/her height so that the user's eye can perfectly align with a gunsight or viewfinder without the need to cock the head or place the body into a crouch.

The present invention is very compact, about nine inches from base to summit, so it takes up little space in the user's pack, or can easily be clamped to the outside of a pack. It is also lightweight, weighing approximately six ounces, yet is extremely durable in its construction. This durability is key to providing the user with a firm and stable platform, even for objects that weigh up to ten pounds. The present invention's firmness and stability is owed chiefly to the design at the present invention's base, at which is placed a heavy duty spring clamp and a stabilization bar with bumpers that hold the present invention firmly in place on a surface and eliminate the chance of it tilting from side to side. Although the spring clamp is heavy duty, most users will be able to manipulate and reposition it with one hand.

Durability and simple but ingenious design are present as well in the parts of the present invention above the base. The spring clamp is fused onto a support tube of aluminum that houses a rod of galvanized steel. When employed as a rifle rest, the rod connects to a holding member that securely holds the forend of the rifle stock when aiming and firing. The rod and holding member are connected by a threaded fitting, preferably made of brass, the top of which is "press fit" into the bottom of the holding member. The bottom of the fitting has female threads, allowing connection with the rod. The fitting and holding member can be removed from the rod, allowing the rod to be inserted into another device, such as a camera, telescope, or small video camera, for mounting on the present invention.

DETAILED DESCRIPTION OF THE PRESENT INVENTION

The present invention is a portable support mount (5) that can be employed as a rifle rest or as a mount for a camera, telescope, small video camera, or other device. In its capacity as a rifle rest, the portable support mount (5) is designed to be attached to a shooting rail (i.e., a tree stand or other surface) to support and stabilize a rifle during aiming and firing. The design features of the present invention are shown, in the preferred embodiment of the present invention, in FIG. 1 and FIG. 2.

Figure 1:
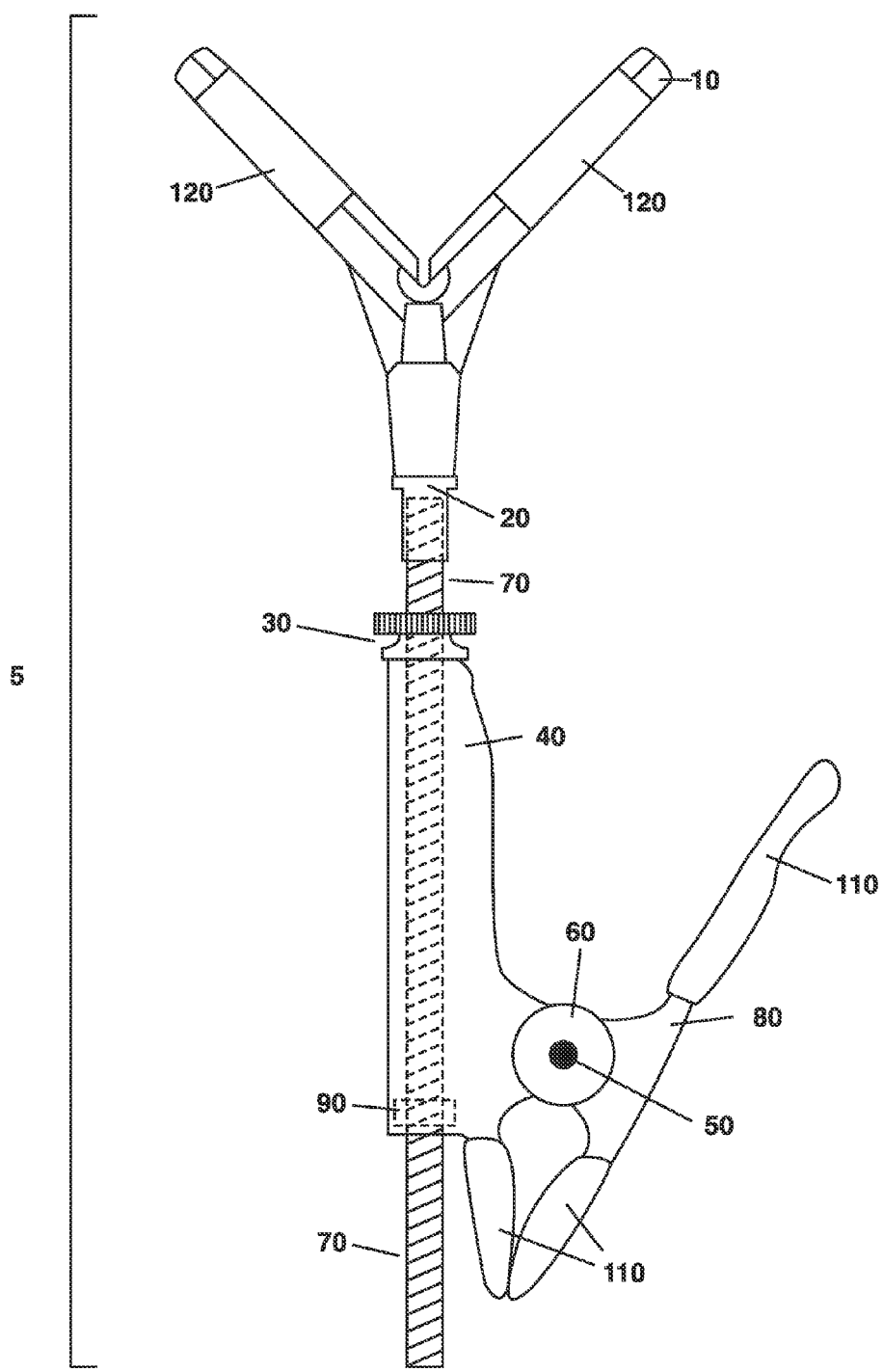
FIG. 1 shows a side view of the present invention.

FIG. 1 shows a side view of the portable support mount (5) in the preferred embodiment. At the base of the portable support mount (5) is a conventional 1-inch spring clamp (80) used to attach the portable support mount (5) to a shooting rail or other surface. The spring clamp (80) is made of stamped steel, with conventional protective vinyl (110) on the handle and jaw of the spring clamp (80). Assisting the spring clamp (80) in keeping the portable support mount (5) secure is the stabilization bar (50), which is made of stainless steel material and inserted through the center of the spring clamp (80) perpendicular to the spring clamp (80) (see FIG. 2 for front view). Bumpers (60) made of rubber are placed on the stabilization bar (50), one bumper (60) on each end of the stabilization bar (50), so that when the spring clamp (80) is fastened to a surface, the bumpers (60) will rest on that surface and hold the portable support mount (5) level with that surface. The stabilization bar (50) and bumpers (60) work in conjunction with the spring clamp (80) to keep the portable support mount (5) held firmly in place so that it will not shift when the user aims and fires a rifle. The stabilization bar (50), the bumpers (60), and the spring clamp (80) also keep the portable support mount (5) held firmly in place when the portable support mount (5) is attached to a camera, telescope, or small video camera, keeping the attached object stationary when employed by the user.

Continuing with the examination of the present invention in its preferred embodiment, FIG. 1 also shows the support tube (40) fused to one of the handles of the spring clamp (80). The support tube (40) is attached to a handle of the spring clamp (80) with a two-part epoxy adhesive. The support tube (40) is made of 6061-T6 aluminum tubing, and it houses a rod (70) and a hex nut (90) (both shown in FIG. 1 in silhouette within the support tube (40)). The hex nut (90) is a conventional, stainless steel nut that holds the rod (70) in position at the base of the support tube (40). The rod (70) in the preferred embodiment of the present invention is threaded and adjustable, allowing the height of the portable support mount (5) to be raised and lowered. Directly above the support tube (40) is a thumb nut (30) of conventional design and preferably made of nickel plated steel. When loosened, the thumb nut (30) can be moved freely on the threads of the rod (70), allowing the rod (70) to be raised or lowered in order to raise or lower the height of the portable support mount (5). After the user has made the desired height adjustment, the thumb nut (30) can be tightened against the support tube (40) to hold the rod (70) firmly in place. Above the thumb nut (30) is a fitting (20), preferably made of brass, into which the rod (70) is inserted. The rod (70), thumb nut (30), hex nut (90), and fitting (20) all have a ¼"-20 threads per inch (tpi) size in the preferred embodiment of the present invention.

FIG. 1 also shows a detailed view of the holding member (10). The holding member (10), preferably made of injection-molded plastic, is placed at the summit of the portable support mount (5) atop the fitting (20) to form a seat for the forend of the rifle being aimed and fired by the user. (The holding member (10) shown in FIG. 1 is made from a fishing rod holder used for bank fishing, and is available for purchase as the "Jumbo V Rest" from Travin products in the UK.) At the base of the holding member (10) is the fitting (20), and the top of the fitting (20) is "press fit" into a recess on the bottom of the holding member (10). The lower part of the fitting (20) is connected to the top of the rod (70) by means of ¼"-20 threads per inch (tpi) threads. Because the fitting (20) can be unscrewed from the rod (70), the holding member (10) can be removed from the portable support mount (5) and another item can be mounted on the rod (70) instead, such as a camera, telescope, small video camera, etc. The support tube (40) and spring clamp (80) are coated with a textured paint used for outdoor furniture, and a covering (120), preferably made of electrical wiring shrink wrap, is placed on each of the two arms of the holding member (10) to protect the forend of the rifle from being scratched by the holding member (10).

Figure 2:
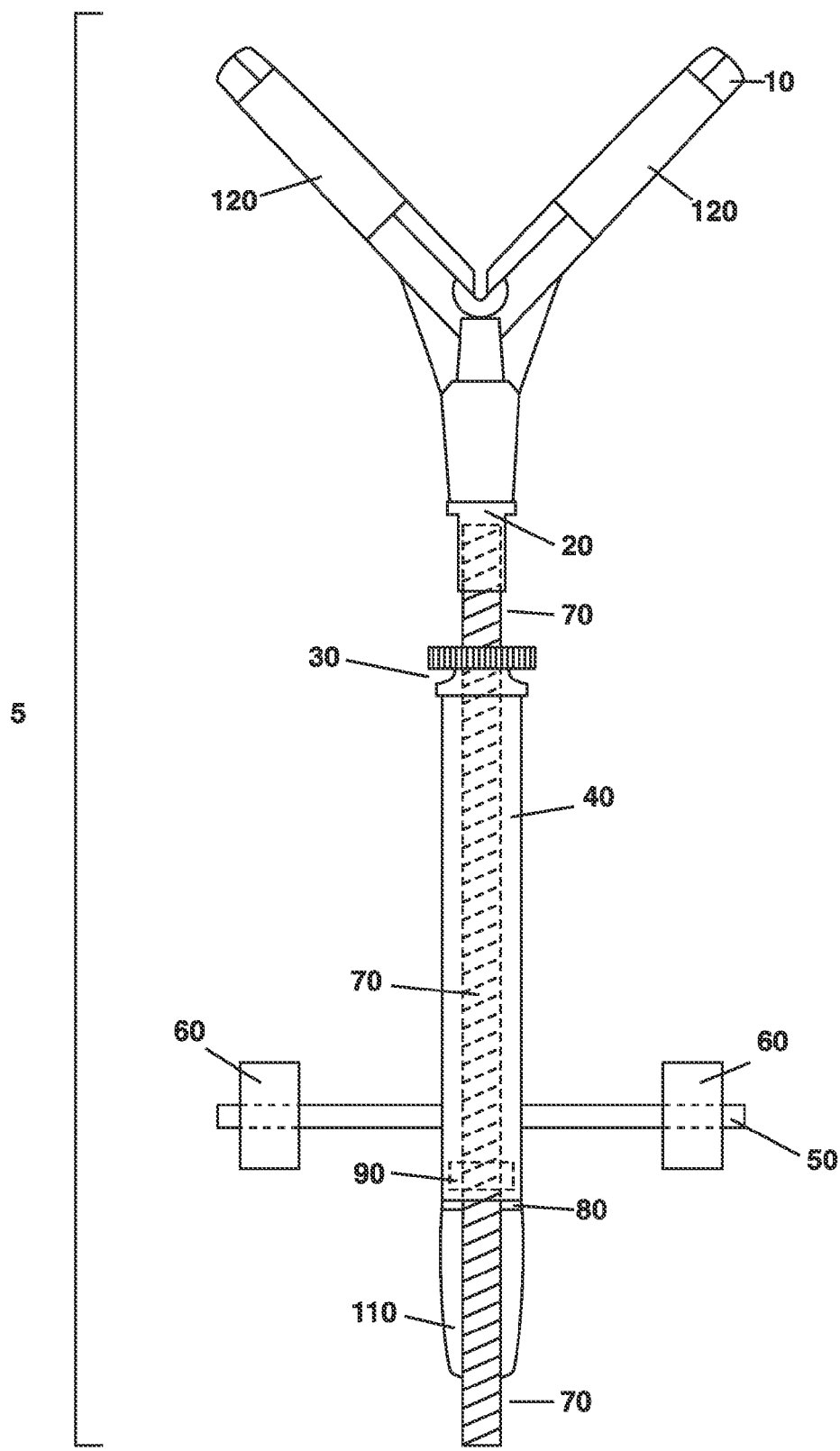
FIG. 2 shows a front view of the present invention

FIG. 2 shows a front view of the portable support mount (5) in the preferred embodiment of the present invention. At the base of the portable support mount (5) can be seen a small portion of the spring clamp (80) and one of its pieces of protective vinyl (110) (see FIG. 1 for full view of the spring clamp (80)). The stabilization bar (50), which is inserted through the center of the spring clamp (80) perpendicular to the spring clamp (80) (see FIG. 1), is shown with bumpers (60), one placed on each end of the stabilization bar (50), to stabilize the portable support mount (5) against a shooting rail or other surface. The stabilization bar (50) and its bumpers (60) work in conjunction with the spring clamp (80) to keep the portable support mount (5) held firmly in place so that it will not shift when the user aims and fires a rifle, takes a picture with an attached camera, etc.

FIG. 2 also shows the front view of the support tube (40), which is attached to the handle of the spring clamp (80) with a two-part epoxy adhesive (see FIG. 1). Inside the support tube (40) are the rod (70) and a hex nut (90) (both shown in silhouette within the support tube (40)). The hex nut (90) holds the rod (70) in place at the base of the support tube (40). At the summit of the support tube (40), the thumb nut (30) can be moved freely on the threads of the rod (70) in order to help raise and lower the height of the portable support mount (5), and after the user has made the desired height adjustment, the thumb nut (30) can be tightened against the support tube (40) to hold the rod (70) firmly in place.

FIG. 2 also shows a detailed view of the holding member (10). The holding member (10), made of injection-molded plastic in the preferred embodiment, is placed at the top of the portable support mount (5), and forms a seat for the forend of the rifle being aimed and fired by the user. At the base of the holding member (10) is the fitting (20), preferably made of brass, with the top of the fitting (20) "press fit" into a recess on the bottom of the holding member (10). The lower portion of the fitting (20) is connected to the top of the rod (70) by means of ¼"-20 tpi threads. Because the fitting (20) can be unscrewed from the rod (70), the holding member (10) can be removed from the portable support mount (5) and other items can be mounted on the rod (70) instead, such as a camera, small video camera, a telescope, etc. The support tube (40) and spring clamp (80) are coated with a textured paint used for outdoor furniture, and a covering (120) (of preferably electrical wiring shrink wrap) is placed on each of the two arms of the holding member (10) to protect the forend of the rifle from scratches.

In summary, the preferred embodiment of the present invention is a portable support mount (5) comprising a spring clamp (80), a stabilization bar (50) (having a first end and a second end) in communication with the spring clamp (80), a support tube (40) in communication with the spring clamp (80), and a holding member (10) in communication with the support tube (40). The holding member (10) has a Y shape, and a rod (70) is in communication with the support tube (40) and the holding member (10). In addition, a fitting (20) is in communication with the holding member (10) and with the rod (70), and bumpers (60) are in communication with the stabilization bar (50), the bumpers (60) disposed at the first end and the second end of the stabilization bar (50) and made of rubber. A covering (120) is placed on top of the holding member (10). Furthermore, the rod (70) is in communication with the support tube (40) via threads, and a thumb nut (30) is also in communication with the support tube (40) and the rod (70).

An additional embodiment of the present invention envisions a portable support mount (5) comprising a spring clamp (80), a stabilization bar (50) in communication with the spring clamp (80), a support tube in communication with the spring clamp (80), and a rod in communication with the support tube (40).

A further embodiment of the present invention envisions a portable support mount (5) comprising a spring clamp (80), a support tube (40) in communication with the spring clamp (80), and a holding member (10) in communication with the support tube (40). This embodiment is also envisioned with a rod (70) in communication with the support tube (40), a fitting (20) in communication with the holding member (10), and a thumb nut in communication with the support tube (40).

Having illustrated the present invention, it should be understood that various adjustments and versions might be implemented without venturing away from the essence of the present invention. The present invention is not limited to the embodiments described above, and should be interpreted as any and all embodiments within the scope of the following claims.

I claim:

1. A portable support mount, comprising:
   a spring clamp;
   a stabilization bar, having a first end and a second end, in communication with said spring clamp;
   a support tube, in communication with said spring clamp;
   a holding member, in communication with said support tube;
   wherein said holding member has a Y shape;
   further comprising a rod in communication with said support tube;
   wherein said rod is in communication with said holding member;
   further comprising a fitting in communication with said holding member; and
   bumpers in communication with said stabilization bar.

2. The portable support mount of claim 1, wherein said bumpers are disposed at said first end and said second end of said stabilization bar.

3. The portable support mount of claim 1, wherein said bumpers are rubber.

4. A portable support mount, comprising:
   a spring clamp;
   a stabilization bar, in communication with said spring clamp;
   a support tube, in communication with said spring clamp;
   a holding member, in communication with said support tube;
   wherein said holding member has a Y shape;
   a rod in communication with said support tube;
   the rod in communication with said holding member;
   a fitting in communication with said holding member;
   bumpers in communication with said stabilization bar;
   wherein said bumpers are disposed at each end of said stabilization bar;
   wherein said bumpers are rubber;
   a fitting in communication with said rod;
   a covering on top of said holding member;
   wherein said rod is in communication with said support tube via threads;
   a thumb nut in communication with said support tube; and
   the thumb nut in communication with said rod.

* * * * *